(12) United States Patent
Chapuis et al.

(10) Patent No.: US 7,394,445 B2
(45) Date of Patent: *Jul. 1, 2008

(54) DIGITAL POWER MANAGER FOR CONTROLLING AND MONITORING AN ARRAY OF POINT-OF-LOAD REGULATORS

(75) Inventors: Alain Chapuis, Morgan Hill, CA (US); Mikhail Guz, Daly City, CA (US)

(73) Assignee: Power-One, Inc., Camarillo, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 11/048,014

(22) Filed: Jan. 31, 2005

(65) Prior Publication Data

US 2006/0015616 A1    Jan. 19, 2006

Related U.S. Application Data

(63) Continuation-in-part of application No. 10/326,222, filed on Dec. 21, 2002, now Pat. No. 7,000,125, which is a continuation-in-part of application No. 10/293,001, filed on Nov. 13, 2002, now Pat. No. 7,049,798, which is a continuation of application No. 10/293,531, filed on Nov. 12, 2002, now Pat. No. 6,949,916.

(60) Provisional application No. 60/588,594, filed on Jul. 16, 2004.

(51) Int. Cl.
   *G09G 3/36* (2006.01)

(52) U.S. Cl. ............................. 345/89; 345/95; 345/204; 345/210; 345/211; 345/212

(58) Field of Classification Search ........... 345/89–103, 345/204–215; 713/300, 310, 330–340; 323/282
   See application file for complete search history.

(56) References Cited

U.S. PATENT DOCUMENTS 429,581 A     6/1890 Tan (Continued)

FOREIGN PATENT DOCUMENTS

CN    2521825    11/2002

(Continued)

OTHER PUBLICATIONS

"Synchronization of Multiple Voltage Regulator Outputs," by M.W. Mueller et al. IBM Technical Disclosure Bulletin, Jun. 1999; (2 pages).

(Continued)

*Primary Examiner*—Vijay Shankar
(74) *Attorney, Agent, or Firm*—O'Melveny & Myers LLP

(57) ABSTRACT

A power control system comprises a plurality of point-of-load (POL) regulators each adapted to convey regulated power to a load, a serial data bus operatively connecting the plurality of POL regulators, and a digital power manager connected to the data bus. The digital power manager includes a controller adapted to execute stored instructions to program operational parameters of the plurality of POL regulators via the serial data bus and receive monitoring data from the plurality of POL regulators via the serial data bus. The digital power manager further comprises a user interface, such as an I²C interface, adapted to receive programming data therefrom and send monitoring data thereto. The digital power manager further comprises a non-volatile memory containing a plurality of registers, including a digital power manager configuration register containing data values defining a configuration of the power control system, a POL set-up register containing data values reflecting programming state of one of the POL regulators, a POL monitor register containing data values reflecting status of operating conditions within one of the POL regulators, and a user-definable space. The digital power manager is adapted to program voltage margining of each of the POL regulators.

37 Claims, 7 Drawing Sheets

U.S. PATENT DOCUMENTS

| | | | |
|---|---|---|---|
| 3,660,672 A | 5/1972 | Berger et al. |
| 4,194,147 A | 3/1980 | Payne et al. |
| 4,204,249 A | 5/1980 | Dye et al. |
| 4,328,429 A | 5/1982 | Kublick et al. |
| 4,335,445 A | 6/1982 | Nercessian |
| 4,350,943 A | 9/1982 | Pritchard |
| 4,451,773 A | 5/1984 | Papathomas et al. |
| 4,538,073 A | 8/1985 | Freige et al. |
| 4,538,101 A | 8/1985 | Shimpo et al. |
| 4,616,142 A | 10/1986 | Upadhyay et al. |
| 4,622,627 A | 11/1986 | Rodriguez et al. |
| 4,630,187 A | 12/1986 | Henze |
| 4,654,769 A | 3/1987 | Middlebrook |
| 4,677,566 A | 6/1987 | Whittaker et al. |
| 4,761,725 A | 8/1988 | Henze |
| 4,940,930 A | 7/1990 | Detweiler |
| 4,988,942 A | 1/1991 | Ekstrand |
| 5,004,972 A | 4/1991 | Roth |
| 5,053,920 A | 10/1991 | Staffiere et al. |
| 5,073,848 A | 12/1991 | Steigerwald et al. |
| 5,079,498 A | 1/1992 | Cleasby et al. |
| 5,117,430 A | 5/1992 | Berglund |
| 5,168,208 A | 12/1992 | Schultz et al. |
| 5,229,699 A | 7/1993 | Chu et al. |
| 5,270,904 A | 12/1993 | Gulczynski |
| 5,272,614 A | 12/1993 | Brunk et al. |
| 5,287,055 A | 2/1994 | Cini et al. |
| 5,349,523 A | 9/1994 | Inou et al. |
| 5,377,090 A | 12/1994 | Steigerwald |
| 5,426,425 A | 6/1995 | Conrad et al. |
| 5,481,140 A | 1/1996 | Maruyama et al. |
| 5,489,904 A | 2/1996 | Hadidi |
| 5,532,577 A | 7/1996 | Doluca |
| 5,627,460 A | 5/1997 | Bazinet et al. |
| 5,631,550 A | 5/1997 | Castro et al. |
| 5,646,509 A | 7/1997 | Berglund et al. |
| 5,675,480 A | 10/1997 | Stanford |
| 5,727,208 A | 3/1998 | Brown |
| 5,752,047 A | 5/1998 | Darby et al. |
| 5,815,018 A | 9/1998 | Soborski |
| 5,847,950 A | 12/1998 | Bhagwat |
| 5,870,296 A | 2/1999 | Schaffer |
| 5,872,984 A | 2/1999 | Berglund et al. |
| 5,874,912 A | 2/1999 | Hasegawa |
| 5,883,797 A | 3/1999 | Amaro et al. |
| 5,889,392 A | 3/1999 | Moore et al. |
| 5,892,933 A | 4/1999 | Voltz |
| 5,905,370 A | 5/1999 | Bryson |
| 5,917,719 A | 6/1999 | Hoffman et al. |
| 5,929,618 A | 7/1999 | Boylan et al. |
| 5,929,620 A | 7/1999 | Dobkin et al. |
| 5,935,252 A | 8/1999 | Berglund et al. |
| 5,943,227 A | 8/1999 | Bryson et al. |
| 5,946,495 A | 8/1999 | Scholhamer et al. |
| 5,990,669 A | 11/1999 | Brown |
| 5,994,885 A | 11/1999 | Wilcox et al. |
| 6,021,059 A | 2/2000 | Kennedy |
| 6,055,163 A | 4/2000 | Wagner et al. |
| 6,057,607 A | 5/2000 | Rader, III et al. |
| 6,079,026 A | 6/2000 | Berglund et al. |
| 6,100,676 A | 8/2000 | Burstein et al. |
| 6,111,396 A | 8/2000 | Line et al. |
| 6,115,441 A | 9/2000 | Douglass et al. |
| 6,121,760 A | 9/2000 | Marshall et al. |
| 6,137,280 A | 10/2000 | Ackermann |
| 6,150,803 A | 11/2000 | Varga |
| 6,157,093 A | 12/2000 | Giannopoulos et al. |
| 6,157,182 A | 12/2000 | Tanaka et al. |
| 6,163,143 A | 12/2000 | Shimamori |
| 6,163,178 A | 12/2000 | Stark et al. |
| 6,170,062 B1 | 1/2001 | Henrie |
| 6,177,787 B1 | 1/2001 | Hobrecht |
| 6,181,029 B1 | 1/2001 | Berglund et al. |
| 6,191,566 B1 | 2/2001 | Petricek et al. |
| 6,194,883 B1 | 2/2001 | Shimamori |
| 6,198,261 B1 | 3/2001 | Schultz et al. |
| 6,199,130 B1 | 3/2001 | Berglund et al. |
| 6,208,127 B1 | 3/2001 | Doluca |
| 6,211,579 B1 | 4/2001 | Blair |
| 6,246,219 B1 | 6/2001 | Lynch et al. |
| 6,249,111 B1 | 6/2001 | Nguyen |
| 6,262,900 B1 | 7/2001 | Suntio |
| 6,288,595 B1 | 9/2001 | Hirakata et al. |
| 6,291,975 B1 | 9/2001 | Snodgrass |
| 6,304,066 B1 | 10/2001 | Wilcox et al. |
| 6,304,823 B1 | 10/2001 | Smit et al. |
| 6,320,768 B1 | 11/2001 | Pham et al. |
| 6,351,108 B1 | 2/2002 | Burstein et al. |
| 6,355,990 B1 | 3/2002 | Mitchell |
| 6,366,069 B1 | 4/2002 | Nguyen et al. |
| 6,373,334 B1 | 4/2002 | Melanson |
| 6,385,024 B1 | 5/2002 | Olson |
| 6,392,577 B1 | 5/2002 | Swanson et al. |
| 6,396,169 B1 | 5/2002 | Voegli et al. |
| 6,396,250 B1 | 5/2002 | Bridge |
| 6,400,127 B1 | 6/2002 | Giannopoulos |
| 6,411,071 B1 | 6/2002 | Schultz |
| 6,411,072 B1 | 6/2002 | Feldman |
| 6,421,259 B1 | 7/2002 | Brooks et al. |
| 6,429,630 B2 | 8/2002 | Pohlman et al. |
| 6,448,745 B1 | 9/2002 | Killat |
| 6,456,044 B1 | 9/2002 | Darmawaskita |
| 6,465,909 B1 | 10/2002 | Soo et al. |
| 6,465,993 B1 | 10/2002 | Clarkin et al. |
| 6,469,478 B1 | 10/2002 | Curtin |
| 6,469,484 B2 | 10/2002 | L'Hermite et al. |
| 6,476,589 B2 | 11/2002 | Umminger et al. |
| 6,556,158 B2 | 4/2003 | Steensgaard-Madsen |
| 6,563,294 B2 | 5/2003 | Duffy et al. |
| 6,583,608 B2 | 6/2003 | Zafarana et al. |
| 6,590,369 B2 | 7/2003 | Burstein et al. |
| 6,608,402 B2 | 8/2003 | Soo et al. |
| 6,621,259 B2 | 9/2003 | Jones et al. |
| 6,683,494 B2 | 1/2004 | Stanley |
| 6,686,831 B2 | 2/2004 | Cook |
| 6,693,811 B1 | 2/2004 | Bowman et al. |
| 6,717,389 B1 | 4/2004 | Johnson |
| 6,731,023 B2 | 5/2004 | Rothleitner et al. |
| 6,744,243 B2 | 6/2004 | Daniels et al. |
| 6,771,052 B2 | 8/2004 | Ostojic |
| 6,778,414 B2 | 8/2004 | Chang et al. |
| 6,788,033 B2 | 9/2004 | Vinciarelli |
| 6,788,035 B2 | 9/2004 | Bassett et al. |
| 6,791,298 B2 | 9/2004 | Shenai et al. |
| 6,791,302 B2 | 9/2004 | Tang et al. |
| 6,791,368 B2 | 9/2004 | Tzeng et al. |
| 6,795,009 B2 | 9/2004 | Duffy et al. |
| 6,801,027 B2 | 10/2004 | Hann et al. |
| 6,807,070 B2 | 10/2004 | Ribarich |
| 6,816,758 B2 | 11/2004 | Maxwell, Jr. et al. |
| 6,819,537 B2 | 11/2004 | Pohlman et al. |
| 6,828,765 B1 | 12/2004 | Schultz et al. |
| 6,829,547 B2 | 12/2004 | Law et al. |
| 6,833,691 B2 | 12/2004 | Chapuis |
| 6,850,046 B2 | 2/2005 | Chapuis |
| 6,850,049 B2 | 2/2005 | Kono |
| 6,850,426 B2 | 2/2005 | Kojori et al. |
| 6,853,169 B2 | 2/2005 | Burstein et al. |
| 6,853,174 B1 | 2/2005 | Inn |
| 6,888,339 B1 | 5/2005 | Travaglini et al. |
| 6,903,949 B2 | 6/2005 | Ribarich |
| 6,911,808 B1 | 6/2005 | Shimamori |
| 6,915,440 B2 | 7/2005 | Berglund et al. |
| 6,917,186 B2 | 7/2005 | Klippel et al. |

| | | | |
|---|---|---|---|
| 6,928,560 B1 | 8/2005 | Fell, III et al. | |
| 6,933,709 B2 | 8/2005 | Chapuis | |
| 6,933,711 B2 | 8/2005 | Sutardja et al. | |
| 6,936,999 B2 | 8/2005 | Chapuis | |
| 6,947,273 B2 | 9/2005 | Bassett et al. | |
| 6,963,190 B2 | 11/2005 | Asanuma et al. | |
| 6,965,220 B2 | 11/2005 | Kernahan et al. | |
| 6,965,502 B2 | 11/2005 | Duffy et al. | |
| 6,975,494 B2 | 12/2005 | Tang et al. | |
| 6,977,492 B2 | 12/2005 | Sutardja et al. | |
| 7,000,125 B2 * | 2/2006 | Chapuis et al. | 713/300 |
| 7,007,176 B2 | 2/2006 | Goodfellow et al. | |
| 7,023,672 B2 | 4/2006 | Goodfellow et al. | |
| 7,049,798 B2 * | 5/2006 | Chapuis et al. | 323/282 |
| 7,068,021 B2 | 6/2006 | Chapuis | |
| 7,080,265 B2 | 7/2006 | Thaker et al. | |
| 7,141,956 B2 | 11/2006 | Chapuis | |
| 2001/0033152 A1 | 10/2001 | Pohlman et al. | |
| 2001/0052862 A1 | 12/2001 | Roelofs | |
| 2002/0070718 A1 | 6/2002 | Rose | |
| 2002/0073347 A1 | 6/2002 | Zafarana et al. | |
| 2002/0075710 A1 | 6/2002 | Lin et al. | |
| 2002/0105227 A1 | 8/2002 | Nerone et al. | |
| 2002/0144163 A1 | 10/2002 | Goodfellow et al. | |
| 2003/0006650 A1 | 1/2003 | Tang et al. | |
| 2003/0067404 A1 | 4/2003 | Ruha et al. | |
| 2003/0122429 A1 | 7/2003 | Zhang et al. | |
| 2003/0142513 A1 | 7/2003 | Vinciarelli | |
| 2003/0201761 A1 | 10/2003 | Harris | |
| 2004/0027101 A1 | 2/2004 | Vinciarelli | |
| 2004/0080044 A1 | 4/2004 | Moriyama et al. | |
| 2004/0090219 A1 | 5/2004 | Chapuis | |
| 2004/0093533 A1 | 5/2004 | Chapuis et al. | |
| 2004/0123164 A1 | 6/2004 | Chapuis et al. | |
| 2004/0123167 A1 | 6/2004 | Chapuis | |
| 2004/0135560 A1 | 7/2004 | Kernahan et al. | |
| 2004/0155640 A1 | 8/2004 | Sutardja et al. | |
| 2004/0174147 A1 | 9/2004 | Vinciarelli | |
| 2004/0178780 A1 | 9/2004 | Chapuis | |
| 2004/0189271 A1 | 9/2004 | Hansson et al. | |
| 2004/0201279 A1 * | 10/2004 | Templeton | 307/11 |
| 2004/0225811 A1 | 11/2004 | Fosler | |
| 2004/0246754 A1 | 12/2004 | Chapuis | |
| 2005/0093594 A1 | 5/2005 | Kim et al. | |
| 2005/0117376 A1 | 6/2005 | Wilson | |
| 2005/0146312 A1 | 7/2005 | Kenny et al. | |
| 2005/0200344 A1 | 9/2005 | Chapuis | |
| 2006/0022656 A1 | 2/2006 | Leung et al. | |
| 2006/0149396 A1 * | 7/2006 | Templeton | 700/22 |

FOREIGN PATENT DOCUMENTS

| | | |
|---|---|---|
| EP | 0255258 | 2/1988 |
| EP | 315366 | 5/1989 |
| EP | 0660487 | 6/1995 |
| EP | 0875994 | 11/1998 |
| EP | 0997825 | 5/2000 |
| JP | 1185329 | 3/1999 |
| KR | 200284495 | 8/2002 |
| RU | 1814177 A1 | 5/1993 |
| SU | 1359874 | 12/1985 |
| WO | WO93/19415 | 9/1993 |
| WO | WO 01/22585 A1 | 3/2001 |
| WO | WO02/31943 | 4/2002 |
| WO | WO02/31951 | 4/2002 |
| WO | WO02/50690 | 6/2002 |
| WO | WO02/063688 | 8/2002 |

OTHER PUBLICATIONS

"Power System Controller in an Intelligent Telecom Rectifier Plant," by U. Roth. INTELLEC 1992, pp. 476-483.

Integrity-One: Installation, Operation and Maintenance Manual Power-One, Inc., 1999-2003 Version 1.2 (P025374-P025559).

Data Sheet, Integrity-One Power System—Rack System Power-One, Inc. (P025580-P025583).

Data Sheet, "PCS Controller" Power-One, Inc. (P025584-P025585).

Data Sheet, "PMP 25 Rectifier Module" Power-One, Inc. (P025602-P025603).

"Presenting DALI" AG DALI, 2003, pp. 1-17.

"DALI Manual" DALI AG, Digital Addressable Lighting Interface Activity Group, ZVEI-Division Luminaires, 2001,pp. 1-62.

"Microchip PIC16C781/782 Data Sheet, 8-bit CMOS Microcontrollers with A/D, D/A, OPAMP, Comparators and PSMC" Microchip Technology Inc., 2001, pp. 1-184.

"Microchip AN811, The RS-232/DALI Bridge Interface" Microchip Technology Inc., 2002, DS00811A, pp. 1-8.

"Microchip AN809, Digitally Addressable DALI Dimming Ballast" Microchip Technology Inc., 2002, DS00809B, pp. 1-18.

"The Digital Addressable Lighting Interface (DALI): An Emerging Energy-Conserving Lighting Solution" by Ronat, Odile International Rectifier, Apr. 9, 2002, TP4/9/2002, pp. 1-6.

"Microchip AN703, Using the MCP320X 12-Bit Serial A/D Converter with Microchip PICmicro® Devices" Microchop Technology Inc., 2002, DS00703A, pp. 1-25.

"System Management Bus (SMBus) Specification" Version 2.0 Duracell, Inc., Energizer Power Systems, Inc., Fujitsu, Ltd., Intel Corporation, Linear Technology, Inc., Maxim Integrated Products, Mitsubishi Electric Semiconductor Company, PowerSmart, Inc., Toshiba Battery Cd. Ltd., Unitrode Corporation, USAR Systems, Inc., Aug. 3, 2000, pp. 1-59.

"Fieldbus System Engineering Guidelines" Fieldbus Foundation, 2003-2004, pp. 1-94.

"Technical Overview, Foundation™ fieldbus, Freedom to Choose. Power to Integrate." Fieldbus Foundation, 2003, FD-043 Rev 3.0, pp. 1-37.

"Silicon Labs Preliminary Invalidity Contentions", Civil Action No. 2-05-CV-463 (LED)—May 26, 2006 (U.S. District Court Eastern District of Texas).

33702 Microprocessor Power Supply (3.0A) Analog Products MC33702 Fact Sheet; Motorola/Digital dna/ Power Management Switching; pp. 1-4.

"Motorola Switch Mode Power Supply With Multiple Linear Regulators And High Speed CAN Transceiver" Motorola, Inc. 2002; digital dna; Analog Marketing; Rev. 2.5, Nov. 2002; 33394; Multi-Output Power Supple Semiconductor Technical Data.

"Power Management Solutions For Networking Aplications"; Presented by Luc Darmon Smart Networks Developer Forum 2003—Jun. 4-6 Euro-Disney Paris, France; Motorola digital dna; www.motorola.com/sndf; pp. 1-26.

Preliminary Information 1.5 A Switch-Mode Power Supply With Linear Regulator 33701; Power Supply Integrated Circuit; Motorola Semiconductor Technical Data; Analog Marketing MC33701/D Rev. 1.0, May 2003; Motorola digital dna; pp. 1-24.

"Electronic Products" Power Supply Special The Engineer's Magazine of Product Technology, A Hearst Business Publication, vol. 37, No. 10, Mar. 1995, 4 pages.

"KEKB Power Supply Interface Controller Module" by A. Akiyama, T. Nakamura, M. Yoshida, T. Kubo, N. Yamamoto and T. Katoh. KEK, High Energy Accelerator Research Organization, 1-1 Ohio, Tsukuba 305 Japan, International Conference on Accelerator and Large Experimental Physics and Control Systems, 1997, Beijing, China, 4 pages.

"Magnet Power Supply Control System in KEKB Accelerators" by T.T. Nakamura, A. Akiyama, T. Katoh, Ta. Kubo, N. Yamamoto, M. Yoshida. KEK, Tsukuba, Japan International Conference on Accelerator and Large Experimental Physics Control Systems, 1999, Trieste, Italy, pp. 406-408.

"System Management Bus Specification" Smart Battery System Specifications, Revision 1.1, Dec. 11, 1998 Copyright 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG, All rights reserved, 39 pages.

"The I2C-Bus Specification" Version 2.1, Jan. 2000, Document Order No. 9398 393 40011, pp. 1-46.

"Quantization Resolution and Limit Cycling in Digitally Controlled PWM Converters" by Angel V. Peterchev and A.V. Sanders Electrical Engineering and Computer Science; US Berkley; Power Electronics Specialists Conference 2001.PESC, vol. 2, Jun. 17-21, 2001, pp. 465-471; XP002274573.

"Distributed Intelligence and Modular Architecture for Next Generation DC Power System" by Louis Duguay and Pierre Got Astec Advanced Power Systems, Quebec, Canada; 6 pgs.

"Digitally-Controlled SMPS Extends Power System Capabilities" by Ron Vinsant, John DiFiore, and Richard Clarke PCIM, Jun. 1994, pp. 30-37.

"Operating and Service Manual", SBC488A, Magna-Power Electronics, Inc., Dec. 19, 2002, 58 pgs.

"Operating and Service Manual", SQ Series, DC Power Supplies Magna-Power Electronics, Inc., Dec. 16, 2002, 48 pgs.

"Uniform Language for Accessing Power Plants—Human-Machine Language", ANSI T1.317-1993 American National Standards Institute, Dec. 14, 1993, 55 pages.

"An Intelligent, Fault Tolerant, High Power, Distributed Power System for Massively Parallel Processing Computers" by J. Burns, J. Riel and T. TiBene IEEE, May 1994, 0-7803-1456-5/94, pp. 795-800.

"BE510 / BE510S Modules"—Bipolar DC Source from 100mV to 20V and from 100nA to 4A Innovative Test Systems; BE510 Version II, Issue 9, Nov. 12, 2000, 3 pgs.

"BE52x Modules"—Multi-range bipolar DC sources from 30V to 500V, 90W Innovative Test Systems; BE52x Version A, Issue 9, Aug. 3, 2001, 3 pages.

"PCX-150A 150 Amp Pulsed Current Source Operation Manual", Version 3.0 Directed Energy, Inc., 2001, Document No. 9100-0212 R4, 31 pages.

"New Applications Demand Programmable Power Supplies/Sources" by Paul O'Shea http://www.evaluationengineering.com/archiv/articles/0997powr.htm, Nelson Publishing, Inc., 1997, 8 pages.

"Market Trends Toward Enhanced Control of Electronic Power Systems" by F.M. Miles, R.K. Danak, T.G. Wilson and G.G. Suranyi IEEE, 1993, 0-7803-0982-0/93, pp. 92-98.

"R Option, S Option DC Power Supplies", IEEE 488.2/RS-232 Programming Manual Power Ten, Document No. M550013-01 Rev C, Jun. 25, 2002, 56 pages.

"A Digitally Controlled Zero-Voltage-Switched Fullbridge Converter" by Karl-Heinz Rinne, Klaus Theml, Joseph Duigan and Oliver McCarthy Power Conversion, Jun. 1994 Proceedings, pp. 317-324.

"vol. 1: Syntax and Style" Standard Commands for Programmable Instruments (SCPI) Consortium, May 1997, Version 1997.0, 68 pages.

"Integrate Internet Solutions Into Your Energy Management Network" by Johan Sarkinen and Ola Lundin Jun. 1998, 7 pages.

"Automating the Design of a Generic Modular Power System for the Global Market" by George Pedersen, Steve Briggs, and Paul Massey Advance Power Raynham Road, Bishops Stortford, Herts.; CM23 5PF UK.

"An Operation and Maintenance Process Model for Energy Management" by Ola Lundin Ericsson Components AB, Energy Systems Division, S-164 81 KISTA—Stockhold, Sweden; 7 pages.

"Intelligent Platform Management Interface Specification v1.5" Intel, Hewlett-Packard, NEC, Dell, Document Revision 1.1, Feb. 20, 2002, 459 pages.

"vol. 2: Command Reference" SCPI Consortium, May 1997, Version 1997.0, 506 pages.

"vol. 4: Instrument Classes" SCPI Consortium, May 1997, Version 1997.0, 58 pages.

"vol. 1: Syntax and Style" SCPI Consortium, May 1999, Version 1999.0, 67 pages.

"vol. 3: Data Interchange Format" SCPI Consortium, May 1997, Version 1997.0, 73 pages.

"vol. 3: Data Interchange Format" SCPI Consortium, May 1999, Version 1999.0, 72 pages.

"vol. 4: Instrument Classes" SCPI Consortium, May 1999, Version 1999.0, 115 pages.

"Service Guide for Agilent 6610xA Power Modules" Agilent Technologies, Agilent Part No. 5959-3364, Dec. 2002, 101 pages.

"DHP Series DC Power Supplies", IEEE 488.2/RS-232 Options Programming Manual, Sorensen, Division of Elgar Electronics Corporation, Document No. M550005-01 Rev B, Jul. 29, 2002, 32 pages.

"Distributed Power Hot Swap Controller" SMH4804 Summit Microelectronics, Inc., 2050 2.3, Mar. 19, 2001, 32 pages.

"Programmer Manual", PS2520G & PS2521G Programmable Power Supplies, Tektronix, 070-9197-00, 1995, 70 pages.

"User Manual", PS2520, PS2520G, PS2521 & PS2521G Programmable Power Supplies, Tektronix, 070-9196-00, 1995, 56 pages.

"A Power LAN for Telecommunication Power Supply Equipment" by Nicholas Vun C.H., Lau C.T. and Lee B.S. IEEE TENCON '93 Beihing, pp. 24-27.

"VXI Bus Programmable DC Power Supplies" Advanced Power Designs, Inc., Irvine, CA; 4 pages.

"Operating Manual for Internal RS-232 Interface for XT 60 Watt and HPD 300 Watt Series Programmable DC Power Supplies" Xantrex Technology, Inc., 59 pages.

"Auto Sequence Programming Examples for GPIB-M" Xantrex Technology, Inc., Nov. 27, 2002, 1.0a, 4 pages.

"SCPI Programming Examples for GPIB-M" Xantrex Technology, Inc., Nov. 26, 2002, 1.0, 3 pages.

"Implementing a Nationwide Energy Management System" by Stig Sjöberg, Tommy Hedberg, Lars Selberg and Rober Wikström.

"IEEE Standard Codes, Formats, Protocols, and Common Commands for User with IEEE Std 488.1-1987, IEEE Standard Digital Interface for Programmable Instrumentation", IEEE Std 488.2-1992 IEEE, Jun. 18, 1992, ISBN 1-55937-238-9, 254 pages.

"Agilent E3640A-E3649A Programmable dc Power Supplies" Data Sheet Agilent Technologies, 4 pages.

"Agilent E364xA Single Output DC Power Supplies", User's Guide Agilent Technologies, Part No. E3640-90001, Jan. 2000, 207 pages.

"Optimizing Power Product Usage to Speed Design Validation Testing" Application Note 1434 Agilent Technologies, Nov. 22, 2002, 16 pages.

"vol. 2: Command Reference" SCPI Consortium, May 1999, Version 1999.0, 565 pages.

"Why have Monitoring?" by P. Shawyer, P. Hobbs and A. McLeod Texcel Technology PLC, United Kingdom.

"IMPI Intelligent Platform Management Bus Communications Protocol Specification v1.0" Intel, Hewlett-Packard, NEC, Dell, Document Revision 1.0, Nov. 15, 1999, 39 pages.

"Operating and Service Manual", MQ Series DC Power Supplies Magna-Power Electronics, Inc., Dec. 19, 2002, 48 pages.

"User's Guide" Series 661xxA MPS Power Modules & Model 66001A MPS Keyboard Agilent Technologies, Agilent Part No. 5959-3386, Apr. 2000, 53 pages.

"Programming Guide" Series 661xxA MPS Power Modules Agilent Technologies, Agilent Part No. 5959-3362, Sep. 1997, 114 pages.

"Accelerator-Control-System Interface for Intelligent Power Supplies" by S. Cohen Los Alamos National Laboratory, pp. 183-186.

"Testing Intelligent Power Supplies for the Los Alamos National Laboratory Accelerator Complex" by J.C. Sturrock, S. Cohen, B.L. Weintraub, D.J. Hayden and S.F. Archuletta Los Alamos National Laboratory, pp. 217-219.

"Intelligent Power Supply Controller" by R.S. Rumrill and D.J. Reinagel IEEE, Aug. 1991, 0-7803-0135-8/91, PAC 1991, pp. 1537-1539.

"Magnet Power Supply as a Network Object" by S. Cohen and R. Stuewe IEEE, Aug. 1991, 0-7803-0135-8/91, PAC 1991, pp. 929-931.

"Non-Impact Printer Power and Motor Control System on a Chip" by James Masson and Steven Barrow IEEE, Apr. 1995, IEEE Catalogue No. 95TH8025, 0-7803-2423-4/95, pp. 98-103.

"Power Distribution Systems for Future Homes" by Po-Wa Lee, Yim-Shu Lee and Bo-Tao Lin IEEE, Aug. 1999, 0-7803-5769-88/99, pp. 1140-1146.

"Installation Guide" MPS Mainframe Model 66000A Agilent Technologies, Agilent Part No. 66000-90001, Apr. 2000, 26 pages.

"Power System Controller in an Intelligent Telecom Rectifier Plant" by Ueli Roth IEEE, Aug. 1992, 0-7803-0779-8/92, pp. 476-483.

"The Continuing Evolution of Intelligence for Telecommunications Power Plants" by Jimmy Godby IEEE, Apr. 1996, 0-7803-3507-4/96, pp. 70-75.

"Digitally Controlled Power Systems: How Much Intelligence is Needed and Where it Should be" by Tom Lock RELTEC Corporation, 5 pages.

"Controlling and Alarming DC Power Plants via the Internet" by Anthony P. Cosentino, Michael C. Sullivan, Richard V. Baxter, Jr. and John Loeck Power Conversion Products, LLC and Pensar Corporation, 6 pages.

"Defendant's Artesyn Technologies, Inc.'s Preliminary Invalidity Contentions"—(*Power-One, Inc.* vs. *Artesyn Technologies, Inc et al.*) Civil Action No. 2-05-CV-463 (LED), United States District Court for the Eastern District of Texas; Apr. 26, 2006.

25 Watt DC-DC Converters Melcher The Power Partners and Power-One Group of Companies, Industrial Environment, Apr. 4, 1999, DC-DC Converters <40 Watt, G Series, 16 Pages.

48V Programmable How Swap Sequencing Power Controller Summit Microelectronics, Inc., Oct. 30, 2002, SMH4804, 41 Pages.

Advanced Configuration and Power Interface Specification Intel Corporation, Microsoft Corporation, Toshiba Corp, Feb. 2, 1999, Revision 1.0b, 387 Pages.

Advantages of Microcontrollers in DC-DC Converters, Galaxy Power, Jan. 1, 2003 IBM Symposium, Real Solutions for Distributed Power, 8 Pages.

Architecture and IC implementation of a digital VRm controller Jinwen, Xiao et al, 32nd Annual IEEE Power Electronics Specialists Conference. PESC 2001. Conference Proceedings. Vancouver, Canada, Jun. 17-21, 2001, Annual Power Electronics Specialists Conference, New York, NY : IEEE, US, vol. vol. 1 or 4. Conf. 32, Jun. 17, 2001, pp. 38-47, XP010559121 ISBN: 0-7803-7067-8, figure 7.

Characteristics of Automated Power System Monitoring & Management Platforms Hawkins, John M.; Telepower Australia Pty Ltd, Jan. 1, 2000, telepower@telepower.com.au, IEEE, Intelec, 5 Pages.

Chemistry-Independent Battery Chargers Maxim Integrated Products, Dec. 1, 2002, 19-1158, Rev 1, MAX1647/MAX1648, 25 Pages.

Current-Fed Multiple-Output Power Conversion Seamus O'Driscoll; John G. Hayes and Michael G. Egan; Artesyn Technologies; Dept. of Electrical Engineering, University College Cork, Ireland, Dec. 3, 2003, 7 pages.

Digital Multiphase Power from Primarion and Intersil Changing the Landscape of Processor Power Primarion, Inc., White Paper, Sep. 12, 2002, 6 pages.

Dual 550kHz Synchronous 2-Phase Switching Regulator Controller, Linear Technology, Jan. 1, 1998, LTC1702, 36 Pages.

Dual Smart Card Interface TDA8020HL Philips Semiconductors, Integrated Circuits, Data Sheet, Feb. 24, 2001, I2C Bus,TDA8020JL, Objective Specification v4.2 Supersedes data of Jan. 2001 File under Integrated Circuits, ICXX, 22 Pages.

Dual Smart Card Interface TDA8020HL/C2 Christophe Chausset, Philips Semiconductors, May 20, 2003, Application Note, TDA8020HL/C2, AN10232, 28 Pages.

High Efficiency Synchronous Step-Down Switching Regulator, Linear Technology, Jan. 1, 1998, LTC1735, 33 Pages.

High Efficiency, 2-Phase Synchronous Step-Down Switching Regulators, Linear Technology, Jan. 1, 1998, LCT1628/LTC1628-PG, 32 Pages.

High-frequency digital controller IC for DC/DC converters Patella B J et al; APEC 2002. 17th. Annual IEEE Applied Power Electronics Conference and Exposition. Dallas, TX, Mar. 10-14, 2002, Annual Applied Power Electronics Conference, New York, NY : IEEE, US, vol. vol. 2 of 2. Conf. 17, Mar. 10, 2002, pp. 374-380, XP010582947, ISBN: 0-7803-7404-5, p. 375, right hand column; figure 3.

Highly Programmable Voltage Supply Controller and Supervisory Circuit Summit Microelectronics, Inc., Jun. 7, 2001, SMS44, Preliminary, 19 Pages.

Infinite Impulse Response, Wikipedia, http://en.wikipedia.org/wiki/IIR, May 2, 2006, pp. 1-4.

In-Situ Transfer Function Analysis, 2006 Digital Power Forum Presentation; Mark Hagen, Texas Instruments Digital Power Group, Jul. 1, 2006.

In-System Network Analyzer 2006 Digital Power Forum Presentation, Silicon Laboratories, Jul. 7, 2006.

Low Voltage Study Workshop Report Charles E. Mullett; Lou Pechi; PSMA, Power Sources Manufacturers Accosiation, The Multinational Power Electronics Association, Jan. 1, 2001, 150 Pages.

Memorandum Opinion and Order *Power One* v *Artesyn Technologies, Inc.*; Civil Action 2:05cv463, Mar. 22, 2007.

Microprocessor Core Supply Voltage Set by I2C Bus Without VID Lines—Design Note 279 Mark Gurries; Linear Technology—Design Notes, Jan. 7, 2002, 2 Pages.

NEBS Compliant Board Level Power System Thomas J. DeLurio, Mikhail Guz and John Ng; Summit Microelectronics, Power One, Oct. 20, 2002, 7 Pages.

New Digital Power Delivery Architecture Bob Carrol, Primarion, Sep. 1, 2004, 5 Pages.

Power Management for Communications: Corporate Overview Summit Microelectronics Inc., Oct. 1, 2002, 213 Pages.

Power Management for Communications: Product Information Summit Microelectronics, Inc., Jan. 23, 2001, 168 Pages, http://www.summitmicro.com.

Power Semiconductors and Power Supplies—The Building Blocks of the Digital Power Revolution Todd Cooper and Holman Harvey; Stephens, Inc. Investment Bankers, Sep. 1, 2000, 132 Pages.

Programmable Four-Channel Step-Down DC/DC Converter Texas Instruments, Oct. 1, 2001, TPS54900, 16 Pages.

Quad Tracking Power Supply Manager Summit Microelectronics, Inc., Mar. 4, 2002, SMT4004, 35 Pages.

Simple digital hardware to control a PFC converter, A Zumel P et al; JECON'01. Proceedings of the 27th. Annual Conference of the IEEE Industrial Electronics Society. Denver, CO, Nov. 29-Dec. 2, 2001, Annual Conference of the IEEE Industrial Electronics Society, New York, NY : IEEE, US, v01. vol. 1 of 3. Conf. 27, Nov. 29, 2001, pp. 943-948, XP010572905 ISBN: 0-7803-7108-9, paragraph [IIIC].

Single-Inductor Multiple-Output Switching Converters Wing-Hung Ki and Dongsheng Ma; Integrated Power Electronics Laboratory, Department of Electrical and Electronic Engineering, The Hong Kong University of Science and Technology, Clear Water Bay, Hong Kong SAR, China, Jan. 1, 2001, 6 Pages.

Six-Channel Power Supply Supervisor and Cacsade Sequence Controller Summit Microelectronics, Inc., Jul. 16, 2003, SMS66, Preliminary Information, 26 Pages.

SMBus Controls CPU Voltage Regulators without VID Pins Mark Gurries, Design Ideas, Linear Technology Magazine, Sep. 1, 2001, 2 Pages.

SMBus VID Voltage Programmers Linear Technology, Jan. 1, 2001, LTC1699 Series, 20 Pages.

SMH4804, SMP9210 and SMT4004 Telecom Reference Design, Summit Microelectronics, Inc., Sep. 5, 2002, Application Note 25, 17 Pages.

Wide Operating Range, No Sense Step-Down Controller Linear Technology, Jan. 1, 2001, LTC1778/LTC1778-1, 24 Pages.

Wide Operating Range, No Sense Step-Down DC-DC Controller with SMBus Programming Linear Technology, Jan. 1, 2001, LTC1909-8, 34 Pages.

\* cited by examiner

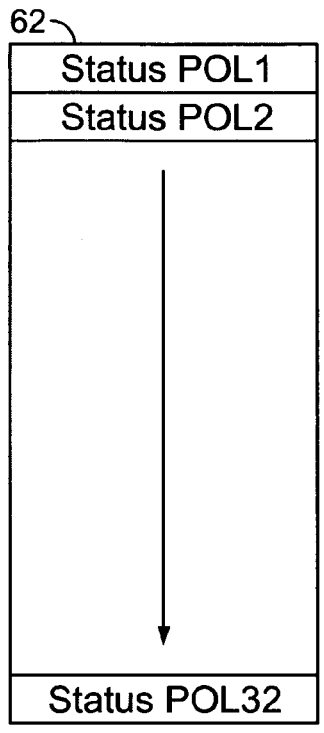
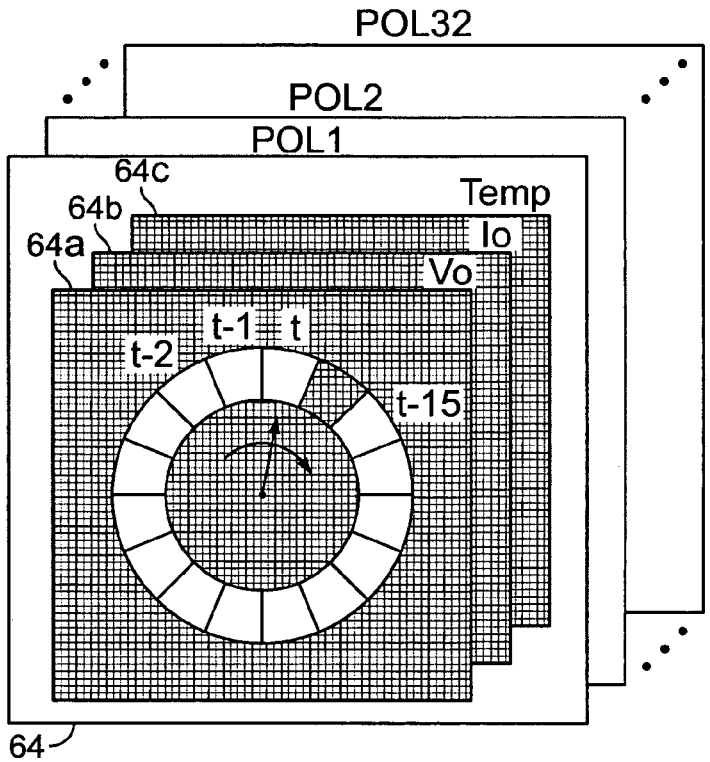
FIG. 3A    FIG. 3B
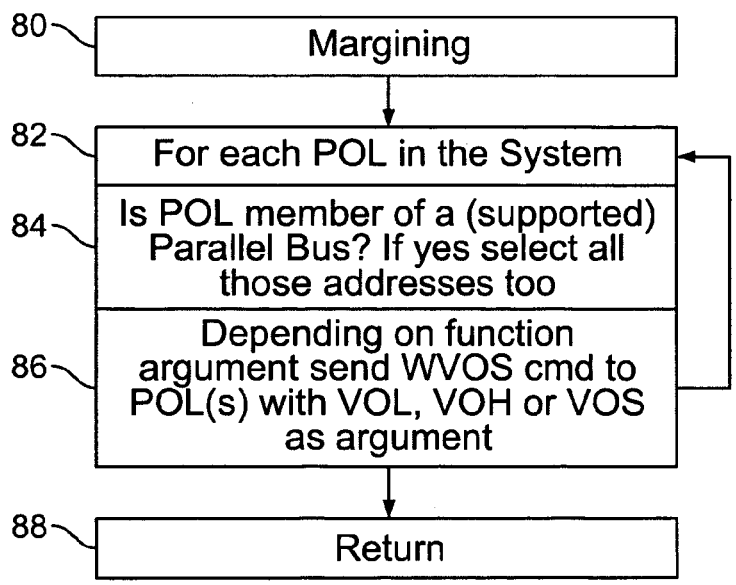
FIG. 4

DIGITAL POWER MANAGER FOR CONTROLLING AND MONITORING AN ARRAY OF POINT-OF-LOAD REGULATORS

RELATED APPLICATION DATA

This patent application claims priority pursuant to 35 U.S.C. § 119(e) to provisional patent application Ser. No. 60/588,594, filed Jul. 16, 2004, for DIGITAL POWER MANAGER FOR CONTROLLING AND MONITORING AN ARRAY OF POINT-OF-LOAD REGULATORS. This patent application also claims priority pursuant to 35 U.S.C. § 120 as a continuation-in-part of each of the following: (1) Ser. No. 10/293,531, filed Nov. 12, 2002, for SYSTEM AND METHOD FOR CONTROLLING A POINT-OF-LOAD REGULATOR, now issued as U.S. Pat. No. 6,949,916 on Sep. 27, 2005; (2) Ser. No. 10/293,001, filed Nov. 13, 2002, for SYSTEM AND METHOD FOR COMMUNICATING WITH A VOLTAGE REGULATOR, now issued as U.S. Pat. No. 7,049,798 on May 23, 2006; and (3) Ser. No. 10/326,222, filed Dec. 21, 2002, for METHOD AND SYSTEM FOR CONTROLLING AND MONITORING AN ARRAY OF POINT-OF-LOAD REGULATORS, now issued as U.S. Pat. No. 7,000,125 on Feb. 14, 2006.

BACKGROUND OF THE INVENTION

1. Field of the Invention

The present invention relates to power control systems, or more particularly, to a method and system to control and monitor an array of point-of-load regulators.

2. Description of Related Art

With the increasing complexity of electronic systems, it is common for an electronic system to require power provided at several different discrete voltage and current levels. For example, electronic systems may include discrete circuits that require voltages such as 3 v, 5 v, 9 v, etc. Further, many of these circuits require a relatively low voltage (e.g., 1 v), but with relatively high current (e.g., 100 A). It is undesirable to deliver relatively high current at low voltages over a relatively long distance through an electronic device for a number of reasons. First, the relatively long physical run of low voltage, high current lines consumes significant circuit board area and congests the routing of signal lines on the circuit board. Second, the impedance of the lines carrying the high current tends to dissipate a lot of power and complicate load regulation. Third, it is difficult to tailor the voltage/current characteristics to accommodate changes in load requirements.

In order to satisfy these power requirements, it is known to distribute an intermediate bus voltage throughout the electronic system, and include an individual point-of-load ("POL") regulator, i.e., DC/DC converter, at the point of power consumption within the electronic system. Particularly, a POL regulator would be included with each respective electronic circuit to convert the intermediate bus voltage to the level required by the electronic circuit. An electronic system may include multiple POL regulators to convert the intermediate bus voltage into each of the multiple voltage levels. Ideally, the POL regulator would be physically located adjacent to the corresponding electronic circuit so as to minimize the length of the low voltage, high current lines through the electronic system. The intermediate bus voltage can be delivered to the multiple POL regulators using low current lines that minimize loss.

With this distributed approach, there is a need to coordinate the control and monitoring of the POL regulators of the power system. The POL regulators generally operate in conjunction with a power supply controller that activates, programs, and monitors the individual POL regulators. It is known in the art for the controller to use a multi-connection parallel bus to activate and program each POL regulator. For example, the parallel bus may communicate an enable/disable bit for turning each POL regulator on and off, and voltage identification (VID) data bits for programming the output voltage set-point of the POL regulators. The controller may further use additional connections to monitor the voltage/current that is delivered by each POL regulator so as to detect fault conditions of the POL regulators. A drawback with such a control system is that it adds complexity and size to the overall electronic system.

Thus, it would be advantageous to have a system and method for controlling and monitoring POL regulators within a distributed power system.

SUMMARY OF THE INVENTION

The invention overcomes these and other disadvantages of the prior art by providing a digital power manager adapted to control and monitor a plurality of POL regulators of a power control system.

In an embodiment of the invention, the power control system comprises a plurality of point-of-load (POL) regulators each adapted to convey regulated power to a load, a serial data bus operatively connecting the plurality of POL regulators, and a digital power manager connected to the data bus. The digital power manager includes a controller adapted to execute stored instructions to program operational parameters of the plurality of POL regulators via the serial data bus and receive monitoring data from the plurality of POL regulators via the serial data bus. The digital power manager further comprises a user interface, such as an I$^2$C interface, adapted to receive programming data therefrom and send monitoring data thereto. The digital power manager further comprises a non-volatile memory containing a plurality of registers, including a digital power manager configuration register containing data values defining a configuration of the power control system, a POL set-up register containing data values reflecting programming state of one of the POL regulators, a POL monitor register containing data values reflecting status of operating conditions within one of the POL regulators, and a user-definable space. The digital power manager is adapted to program voltage margining of each of the POL regulators.

In a further embodiment of the invention, at least one host user system is operatively coupled to the digital power manager. The host user system further comprises a graphical user interface providing monitoring and programming of the power control system. For example, the graphical user interface further provides an interface for programming voltage margining of each of the POL regulators, for monitoring operating conditions of the POL regulators, and/or for programming the POL regulators. The digital power manager is further adapted to receive fault detection information from the POL regulators via the serial data bus.

A more complete understanding of the system and method for controlling and monitoring POL regulators within a distributed power system will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIGS. 3a and 3b graphically depict a monitoring memory in the digital power manager for storing POL parameters;

FIG. 4 is a flow diagram of a process for performing voltage margining of the POL regulators;

DETAILED DESCRIPTION OF THE PREFERRED EMBODIMENT

The present invention provides a digital power manager for controlling and monitoring POL regulators within a distributed power system. In the detailed description that follows, like element numerals are used to describe like elements illustrated in one or more figures.

Figure 1:
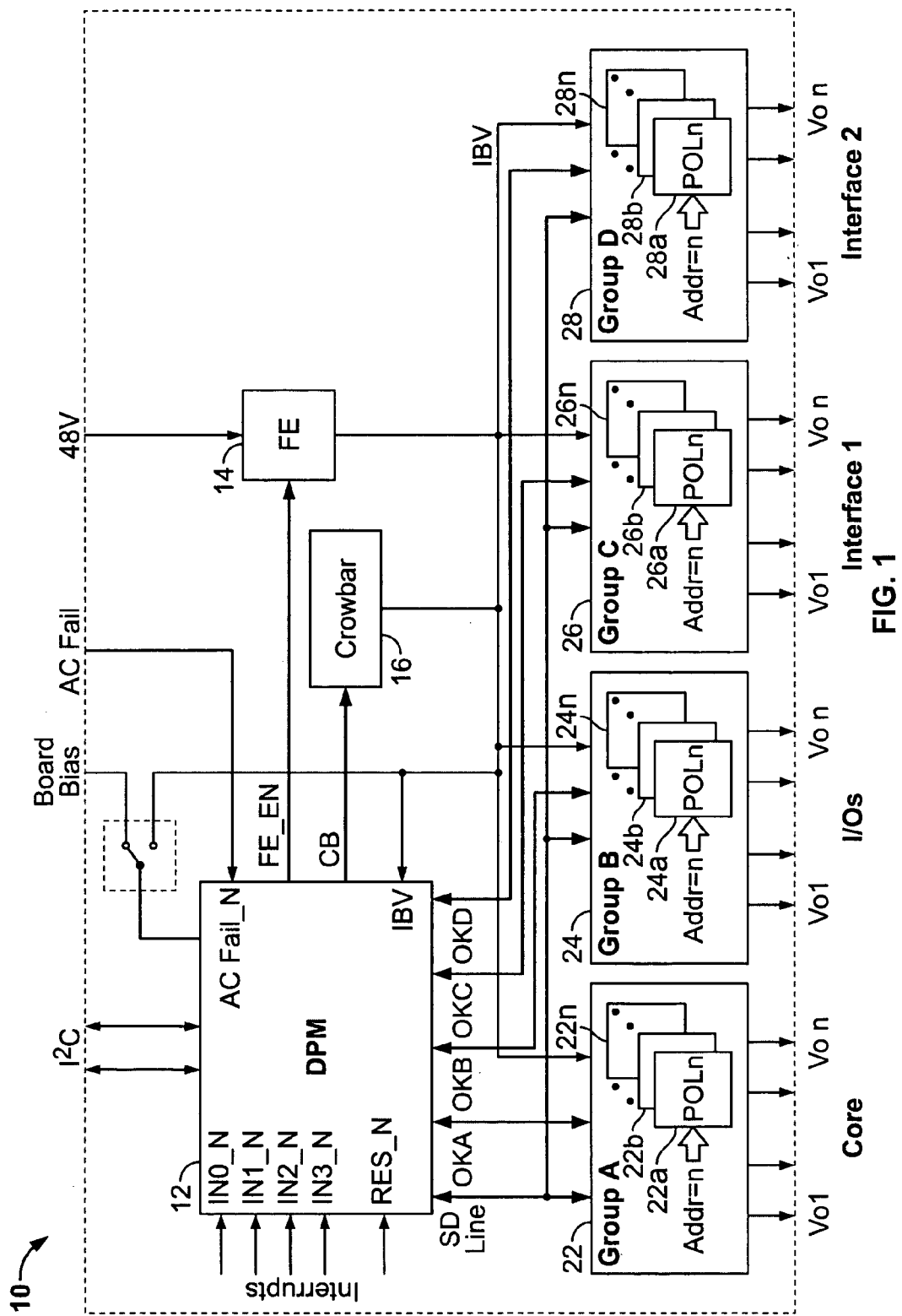
FIG. 1 is a block diagram of an exemplary POL control system in accordance with an embodiment of the invention.

Referring first to FIG. 1, a POL power system 10 is shown in accordance with an embodiment of the present invention. The POL power system 10 includes a digital power manager (DPM) 12, a front-end regulator (FE) 14, and a plurality of power control groups 22, 24, 26, 28 (also labeled Groups A through D). Each of the power control groups includes a plurality of individual POL regulators (such as POL regulators 22a-22n). The POL regulators depicted herein include, but are not limited to, point-of-load regulators, power-on-load regulators, DC/DC converters, voltage regulators, and all other programmable voltage or current regulating devices generally known to those skilled in the art. Each POL regulator has a unique 5-bit address (ADDR) programmed by grounding respective address pins.

Each group of POL regulators produces a plurality of output voltages that are supplied to corresponding loads. The POL regulators may be grouped depending upon the characteristics of the loads that are supplied. For example, POL regulators supplying loads with high dependencies could be placed into one group, e.g., all POL regulators supplying CPU core voltages are placed in Group A, and POL regulators supplying input/output circuits are placed Group B, etc. By grouping plural POL regulators together, the POL regulators within a group can exhibit the same responsive behavior in the case of a fault condition. Grouping enables users to program advanced fault management schemes and define margining functions, monitoring, start-up behavior, and reporting conventions. Each group of POL regulators represents a virtual, and not physical, grouping of POL regulators. The POL regulators of a particular group may actually be physically separated from each other within an electrical system. It should be appreciated that the number of groups and POL regulators depicted in each group in FIG. 1 are presented solely for exemplary purposes, and that a greater or lesser number of groups and/or POL regulators within each group could be advantageously utilized. Moreover, the POL regulators may not be grouped at all, and the POL control system 10 could include a plurality of individual POL regulators.

The front-end regulator 14 draws power from a voltage source (e.g., 48V), and provides an intermediate voltage (IBV) to the plurality of groups 22, 24, 26, 28 over an intermediate voltage bus. The front-end regulator 14 may simply comprise another POL regulator. The digital power manager 12 draws its power from the intermediate voltage bus or from a board bias voltage source. Although depicted as separate devices, the digital power manager 12 and front-end regulator 14 may be integrated together in a single unit. Alternatively, the front-end regulator 14 may provide a plurality of intermediate voltages to the groups of POL regulators over a plurality of intermediate voltage buses.

The digital power manager 12 communicates with the plurality of POL regulators by writing and/or reading digital data (either synchronously or asynchronous) via a unidirectional or bidirectional serial bus, illustrated in FIG. 1 as the synch/data (SD) line. The SD line may comprise a two-wire serial bus (e.g., $I^2C$) that allows data to be transmitted asynchronously or a single-wire serial bus that allows data to be transmitted synchronously (i.e., synchronized to a clock signal). The SD line provides synchronization of all POL regulators to a master clock generated by the digital power manager 12 and simultaneously performs bi-directional data transfer between POL regulators and the digital power manager 12. In order to address any specific POL regulator in any group, each POL regulator is identified with a unique address, which may be hardwired into the POL regulator or set by other methods. The digital power manager 12 also communicates with each one of the plurality of groups for fault management over respective unidirectional or bidirectional serial lines, illustrated in FIG. 1 as the OKA, OKB, OKC and OKD lines (corresponding to each of groups A-D, respectively) (also referred to below as respective OK lines).

The digital power manager 12 communicates with a host user system via a serial data bus ($I^2C$) for programming, setting, and monitoring the POL control system 10. The host user system would include a computer coupled to the $I^2C$ interface, either directly or through a network, having suitable software adapted to communicate with the digital power manager 12. As known in the art, the host computer would be equipped with a graphics-based user interface (GUI) that incorporates movable windows, icons and a mouse, such as based on the Microsoft Windows™ interface. The GUI may include standard preprogrammed formats for representing text and graphics, as generally understood in the art. Information received from the digital power manager 12 is displayed on the computer screen by the GUI, and the host user can program and monitor the operation of the POL control system 10 by making changes on the particular screens of the GUI. The digital power manager 12 performs translation between the $I^2C$ interface connected to the host system or GUI and the SD line connected to the individual POL regulators. The digital power manager 12 can be controlled via the GUI or directly via the $I^2C$ bus by using high and low level commands.

The digital power manager 12 provides undervoltage and overvoltage protections for the intermediate voltage bus, supports error protection by controlling the front-end regulator 14 and a crowbar circuit 16, and performs controlled system shutdown in case of the main AC line failure (reflected by a signal on the AC Fail_N input line). Specifically, the digital power manager 12 communicates with the front-end regulator 14 over a separate line (FE_EN) to disable operation of the front-end regulator 14 in the event of a system-wide fault. If there is a component failure in one of the POL regulators, the output of that POL regulator could experience an overvoltage condition that could damage its respective load. It is therefore very desirable to reduce as quickly as possible the intermediate bus voltage when such a fault is detected. Accordingly, the POL control system may further include an optional crowbar circuit 16 coupled to the intermediate voltage bus, which drives to ground the voltage remaining on the intermediate voltage bus and thereby cuts-off the intermediate voltage ($V_{IN}$) to the POL regulators and prevents any overvoltage conditions.

Figure 2:
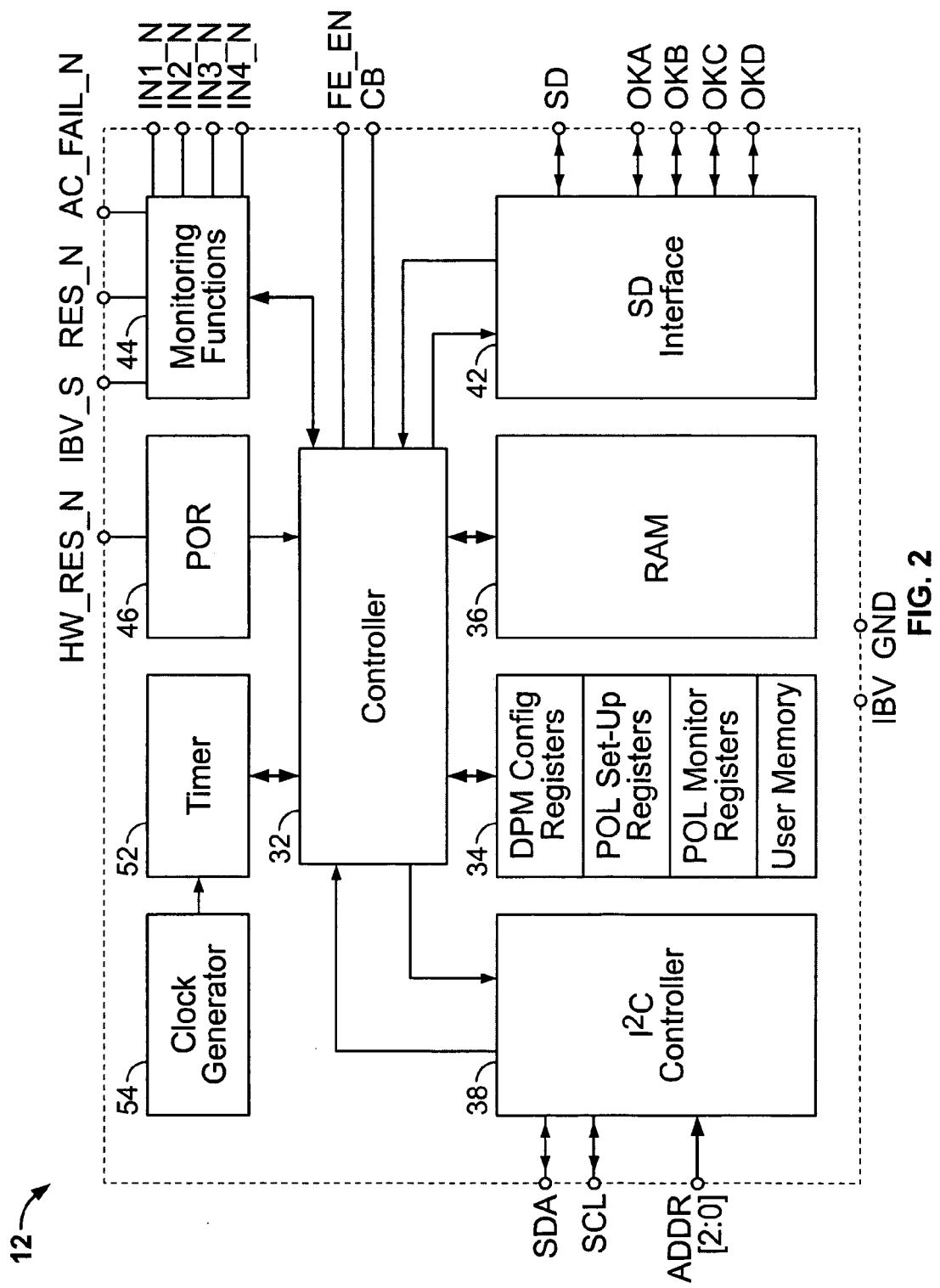
FIG. 2 is a block diagram of an exemplary digital power manager of the POL control system.

FIG. 2 is a block diagram of an exemplary digital power manager 12 of the POL control system. The digital power manager 12 includes a controller 32 that executes stored instructions to control and monitor operations of the digital power manager 12 responsive to commands from the host user, interrupts, and status data received from the POL regulators. A clock generator 54 and timer circuit 52 provide the controller 32 with suitable clock signals to control the timing of internal and external functions. It is anticipated that the digital power manager 12 be included in a single integrated circuit.

The controller 32 is coupled to two memory blocks, including a non-volatile memory 34 (e.g., flash memory) and a random access memory (RAM) 36. Upon start up, data is written from the non-volatile memory 34 to the RAM 36, and the controller thereafter accesses the RAM to use the data. This minimizes the number of read/write cycles of the non-volatile memory 34 to thereby increase its operational life. The non-volatile memory 34 is segmented into four sections, including DPM configuration registers, POL set-up registers, POL monitor registers, and user memory. The DPM configuration registers contain data values reflecting the programming of the digital power manager 12 and defines the configuration of the POL control system. The POL set-up registers contain data values reflecting the programming of the individual POL regulators. The POL monitor registers contain data values reflecting the monitoring of operating conditions within the individual POL regulators. The user memory is a user-definable space that can be used to store user information such as system identification, dates of manufacture, location, application code version, etc. The user can access the user memory through the I²C interface.

Referring briefly to FIGS. 3a and 3b, the POL monitor registers of the non-volatile memory 34 are shown in greater detail. FIG. 3a shows a first register block 62 containing a copy of the POL set-up registers reflecting the programming of each respective POL regulator. The set-up registers define static parameters such as membership in a group and group configuration, fault propagation configuration, interrupt configuration, intermediate bus voltage high and low thresholds, software version, I²C address, etc. Each parameter of the static registers may be selectively write protected, and the user may be selectively granted access to each parameter on a read only or read/write basis.

Figures 8, 9:
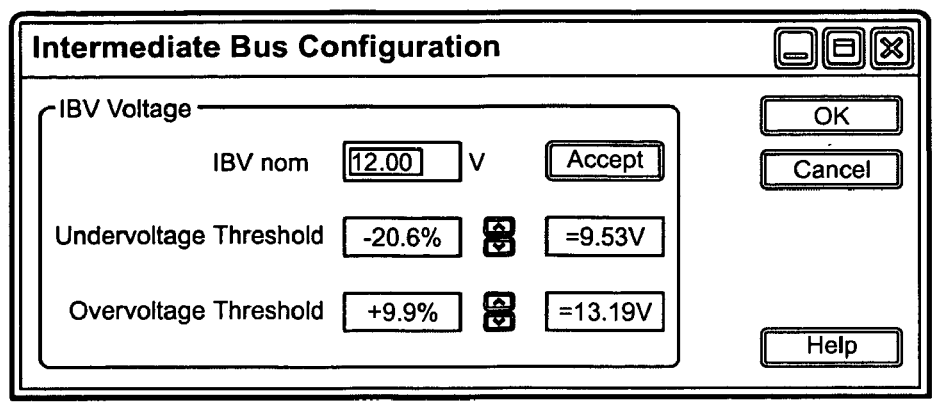
FIG. 8 is an exemplary screen shot depicting a GUI for monitoring intermediate bus voltage status for a POL control system.
FIG. 9 is an exemplary screen shot depicting a GUI for monitoring ring buffer status for a POL control system.

FIG. 3b shows a second register block 64 containing a copy of the POL monitor registers for run-time conditions for each of the POL regulators, including output voltage 64a, current 64b, and temperature 64c. For each parameter, there is a ring buffer of plural values (e.g., fifteen). The parameter is continuously sampled and stored into the ring buffer with the oldest data being overwritten so that a running record of the last samples of the parameters is maintained. In case of system failure, the ring buffer will store data for plural monitoring cycles immediately preceding the system shutdown. After the system shutdown, the ring buffer can be accessed either via the GUI or directly via the I²C bus using high and low level commands. The data will be stored in the ring buffer until the next time the system is turned on, therefore allowing for remote diagnostics and troubleshooting. FIG. 9 illustrates a screen shot of a GUI that enables a user to monitor the status of the ring buffers. The data values for temperature, output voltage and current are listed for a plurality of time samples.

Returning to FIG. 2, the controller 32 communicates with external systems through the I²C controller 38, SD interface 42, monitoring function device 44, and power on reset (POR) device 46. The controller 32 communicates with the user through the I²C controller 38, which provides an interface between the controller 32 and the I²C bus in accordance with the I²C standard. The I²C controller 38 serves as an interface between the controller 32 and the serial I²C bus, and controls all the I²C bus specific sequences, protocol, arbitration and timing. The I²C controller 38 permits bidirectional communication with the digital power manager 12, in either a master mode in which serial data transmitted or received through SDA while SCL outputs the serial clock, or a slave mode in which serial data is transmitted or received through SDA while the serial clock is received through SCL. The I²C controller 38 also includes a 3-bit address (ADDR) input permitting programming of the digital power manager 12 via hardwiring or other signaling.

The controller 32 communicates with the POL regulators through the SD interface 42, which in turn is coupled to the SD line and the OK lines. The status of the OK lines is continuously read and saved to an internal register. Errors from the POL regulators are propagated throughout the power control system 10 through the SD line and the OK lines. An exemplary method and system for monitoring and managing fault conditions is provided in U.S. patent application Ser. No. 10/890,573, filed Jul. 13, 2004, for SYSTEM AND METHOD FOR MANAGING FAULT IN A POWER SYSTEM, the subject matter of which is incorporated by reference herein in its entirety.

The monitoring function device 44 receives various inputs reflecting system level commands, such as intermediate voltage bus sense (IBV_S), manual reset (RES_N), AC-Fail, and a plurality of interrupts (IN1-IN4). The digital power manager 12 continuously monitors the intermediate bus voltage through the IBV_S input. The monitoring function device 44 measures the intermediate bus voltage and compares it to programmable low (undervoltage) and high (overvoltage) thresholds. FIG. 8 illustrates a GUI used to monitor the intermediate bus voltage. The GUI shows the nominal intermediate bus voltage (IBV nom), the undervoltage threshold, and the overvoltage threshold. As shown in FIG. 8, the undervoltage and overvoltage thresholds are selectable in terms of a percentage of the nominal intermediate bus voltage.

When the intermediate bus voltage decreases below the low threshold, the digital power manager 12 will pull all OK lines low and thereby turn off all POL regulators. The POL regulators will then execute a regular turn-off sequence. Contents of the ring buffer (discussed below) will be saved in non-volatile memory 34. When the intermediate bus voltage recovers, the controller 32 will first reprogram all POL regulators and then turn them on through the SD interface 42, if the Auto Turn On is enabled in the GUI. When the intermediate bus voltage exceeds the high threshold, the controller 32 will pull all OK lines low turning off all POL regulators. The POL regulators will execute a regular turn-off sequence. Contents of the ring buffer will be saved in non-volatile memory 34. After a delay (e.g., 50 ms), the controller 32 turns off the front-end regulator 14. If the voltage does not decrease below the threshold within the delay period, the controller 32 will trigger the crowbar circuit 16 to drive the intermediate bus voltage to ground. One second after clearing the intermediate bus voltage high fault, the controller 32 will attempt to turn on the front-end regulator 14. If the intermediate bus voltage is within limits, the controller 32 will reprogram all POL regulators and then turn them on, if the Auto Turn On is enabled in the GUI.

The AC-Fail input is generated by the AC/DC converter (not shown) that supplies the input voltage (e.g., 48V) to the front-end regulator 14. If the AC mains supplying the AC/DC converter fail, the AC-Fail signal notifies the controller 32. If there is no battery back-up for the input voltage, then the input voltage will disappear after a predetermined period (e.g., 20 ms). When the controller 32 receives the AC-Fail signal, the controller will pull all OK lines low, turning off all POL regulators. The POL regulators will execute a regular turn-off sequence. Contents of the ring buffer will be saved in non-volatile memory 34. When the AC voltage recovers and the AC_Fail goes high, the controller 32 will reprogram all POL regulators and then turn them on, if the Auto Turn On is enabled in the GUI.

The RES_N input causes the controller 32 to turn off all POL regulators in response to certain trigger conditions. The interrupts may be programmed to turn off particular parts of the power control system 10. For example, one interrupt may shut down a particular group of POL regulators in order to permit replacement of a user level board or component. The interrupts allow temporary turn-off of POL groups by pulling the interrupt inputs low. The interrupts are enabled in the GUI Interrupt Configuration window or directly via the I²C bus by writing into the DPM Configuration registers.

The power-on reset (POR) 46 receives a reset signal (HW_RES_N) that causes the controller 32 to reset, such as during initial power up of the power control system 10. When the power control system 10 is initially powered up, the power-on reset 46 ensures that the controller 32 starts at a known state. The power-on reset 46 delays initialization of the controller 32 until the intermediate bus voltage has stabilized at an appropriate level.

Performance parameters of the POL regulators can be programmed by the digital power manager 12 via the I²C communication bus without replacing any components or rewiring printed circuit board traces. The POL programming data can be preloaded into the digital power manager 12 or can be programmed by the user via the GUI and the I²C bus. The digital power manager 12 can be programmed either before or after installation on a host board. The POL programming data is stored in the POL configuration registers of the non-volatile memory 34.

The programming of the POL regulators is performed in several steps. Upon power-up, when the voltage on the IBV_S pin exceeds the undervoltage protection threshold, the controller 32 uploads programming data from its static registers into RAM 36. Then, the controller 32 executes the cyclic redundancy check (CRC) to ensure integrity of the programming data. If the result is correct, then the programming data stored in the POL set up registers of non-volatile memory 34 is sent to one of the respective POL regulators via the SD line. Every data transfer command is followed by an acknowledgement and read back procedure. If both acknowledgement and read back operations are successful, then the POL regulator is considered programmed successfully, and the controller 32 continues with programming of the next POL regulator. Upon completion of the programming cycle, programming status information is recorded in the status registers.

FIG. 4 illustrates an exemplary process 80 for programming voltage margining of the POL regulators. Margining is a function performed by the host user to test the voltage at the high and low rail extremes, and allows the user to set the margin for each POL regulator by a desired percentage. In an embodiment of the invention, the output voltage for each POL regulator is set by the user through the GUI. The margin can be programmed for each POL regulator individually, or can be broadcast to all POL regulators of a group, or can be broadcast to all POL regulators of the power control system 10.

Starting at step 82, the process enters a loop in which the margining is determined for each POL regulator in the power control system 10. At step 84, the process determines whether the POL regulator has its outputs connected in parallel with another POL regulator for the purpose of achieving current sharing. When two or more POL regulators are connected in this manner, then the POL regulators of the current share group must be programmed simultaneously. The addresses for all POL regulators of the share group are identified so that the controller 32 may direct programming information to them as well. Then, at step 86, the controller 32 communicates a command to set output voltage set-point (WVOS) with either output voltage margining low value (VOL), output voltage margining high value (VOH), and/or output voltage set-point (VOS) as an argument. The process then returns to step 82 and repeats for the next POL regulator. After margining of each of the POL regulators has been programmed, the process ends at step 88.

Figure 5:
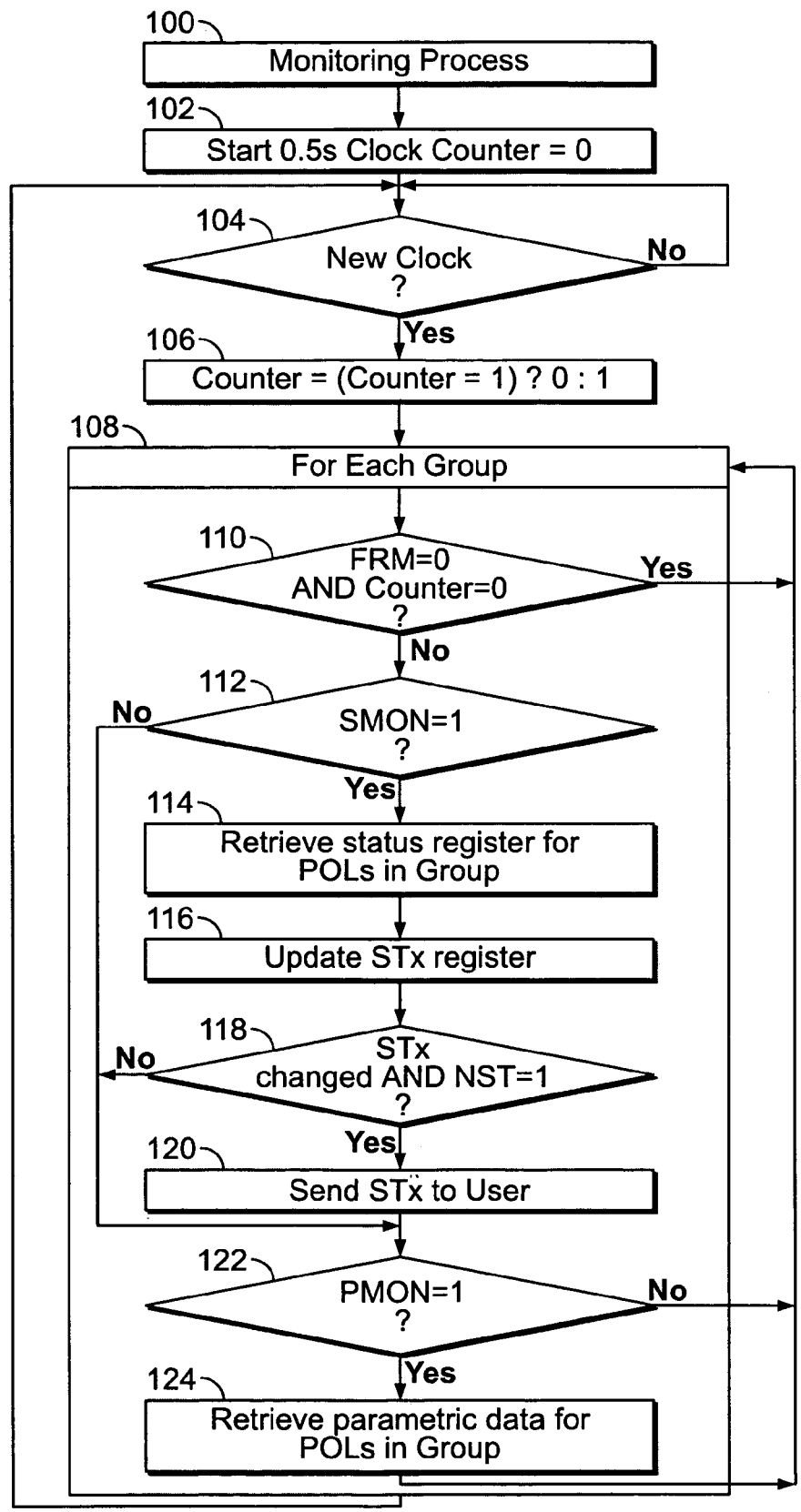
FIG. 5 is a flow diagram of a process for monitoring performance of the POL regulators.

FIG. 5 illustrates a process 100 for monitoring performance of the POL regulators. The process 100 continuously retrieves the monitoring data from the POL regulators, and runs independently from the run status of any of the POL regulators. At step 102, the monitoring process begins by starting a clock and setting a counter to zero. In an embodiment of the invention, the clock counts up to 0.5 seconds and repeats continuously. The counter has two states: one and zero. At step 104, the monitoring process checks whether the clock cycle is new. If it is not a new clock cycle, the process will continue to loop through step 104 until the new clock cycle begins. At step 106, the counter is incremented.

The process next begins a major loop 108 that is repeated for each group of POL regulators. At step 110, the process checks the setting for the frequency of retrieving the monitoring data (FRM). The FRM setting can have two possible states: zero, corresponding to a frequency of 1 Hz; and one, corresponding to a frequency of 2 Hz. The FRM setting is defined in the DPM configuration register included in the non-volatile memory 34. If both the FRM setting is zero and the counter is zero, the process returns to step 108 for the next group of POL regulators. Otherwise, the process passes to step 112, in which the process checks the setting for retrieve status monitoring data (SMON). The SMON setting can have two possible states: zero, corresponding to disabling of auto-retrieve of status monitoring data from the POL regulators; and one, corresponding to enabling of auto-retrieve of status monitoring data from the POL regulators. The SMON setting is defined in the DPM configuration register included in the non-volatile memory 34. If the SMON setting is zero, the process skips down to step 122 (discussed below). Otherwise, the process passes to the next step 114 in which the contents of the status register for the selected group of POL regulators is retrieved. Then, the POL monitor registers included in the non-volatile memory 34 are updated with the new status (STx) information.

At step 118, the process determines whether the status information has changed and whether the setting for notifying the user when STx changes (NST) is equal to one. The NST setting can have two possible states: zero, corresponding to disabling of auto-notification; and one, corresponding to enabling of auto-notification. The NST setting is defined in the DPM configuration register included in the non-volatile memory 34. If there has been a change to the status information and NST is set to enable auto-notification, the status information is sent to the user at step 120. Otherwise, the process skips step 120 and passes to step 122. At step 122, the process checks the setting for retrieve parametric monitoring data (PMON). The PMON setting can have two possible states: zero, corresponding to disabling of auto-retrieve of parametric monitoring data from the POL regulators; and one, corresponding to enabling of auto-retrieve of parametric monitoring data from the POL regulators. The PMON setting is defined in the DPM configuration register included in the non-volatile memory 34. If the PMON setting is zero, the proceeds to step 124 in which the process retrieves parametric data for the POLs of the selected group. Otherwise, the process returns to step 108 and repeats the loop for the next group of POL regulators. Following completion of the loop for each group of POL regulators, the process returns to step 104 to await the start of the next clock cycle.

Figure 6:
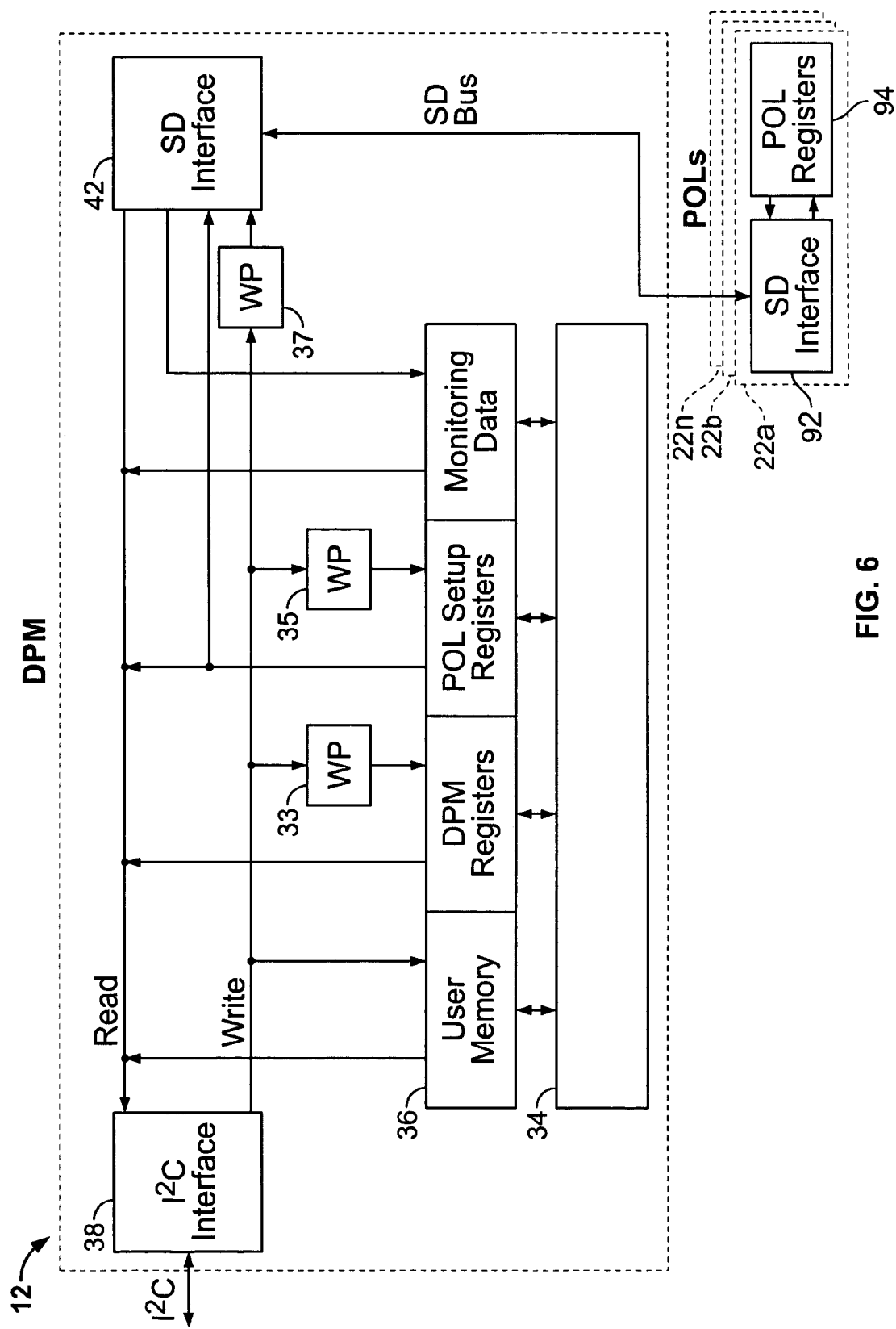
FIG. 6 is a block diagram depicting exemplary partitioning of memory for the digital power manager.

FIG. 6 illustrates the communication of commands and data through the different memory sections contained in the digital power manager 12. Write protection (WP) registers 33, 35, 37 limit the write access to the memory blocks in the non-volatile memory 34 and the POL regulators 22a-22c. The POL regulators 22a-22c are illustrated as each having corresponding SD interface 92 and POL registers 94. As shown in FIG. 6, the content of the non-volatile memory 34 has been written to the RAM 36, and the controller is accessing the RAM to use and update the data. Either the I²C interface 38 or the SD interface 42 can access the content of the RAM 36 using read or write comments. The WP registers 33, 35, 37 are defaulted to write protect upon powering up the digital power manager 12, thereby precluding alteration of the DPM registers or POL set-up registers. Specifically, WP register 33 precludes the user from writing to the DPM register, WP register 35 precludes the user from writing to the POL set-up registers, and WP register 37 precludes the user from writing to the POL registers 94. The user can read data (via the I²C interface 38) from any of the registers, and can freely write to the user memory. The POL regulators can read data only from the POL set-up registers and write data only to the monitoring data registers. In order to change the programming of either the POL regulators or the digital power manager 12, the user must first disable the write protection registers, such as by checking appropriate boxes in a GUI or via the I²C bus. The write protections are automatically restored when input power to the digital power manager 12 input power.

Figure 7:
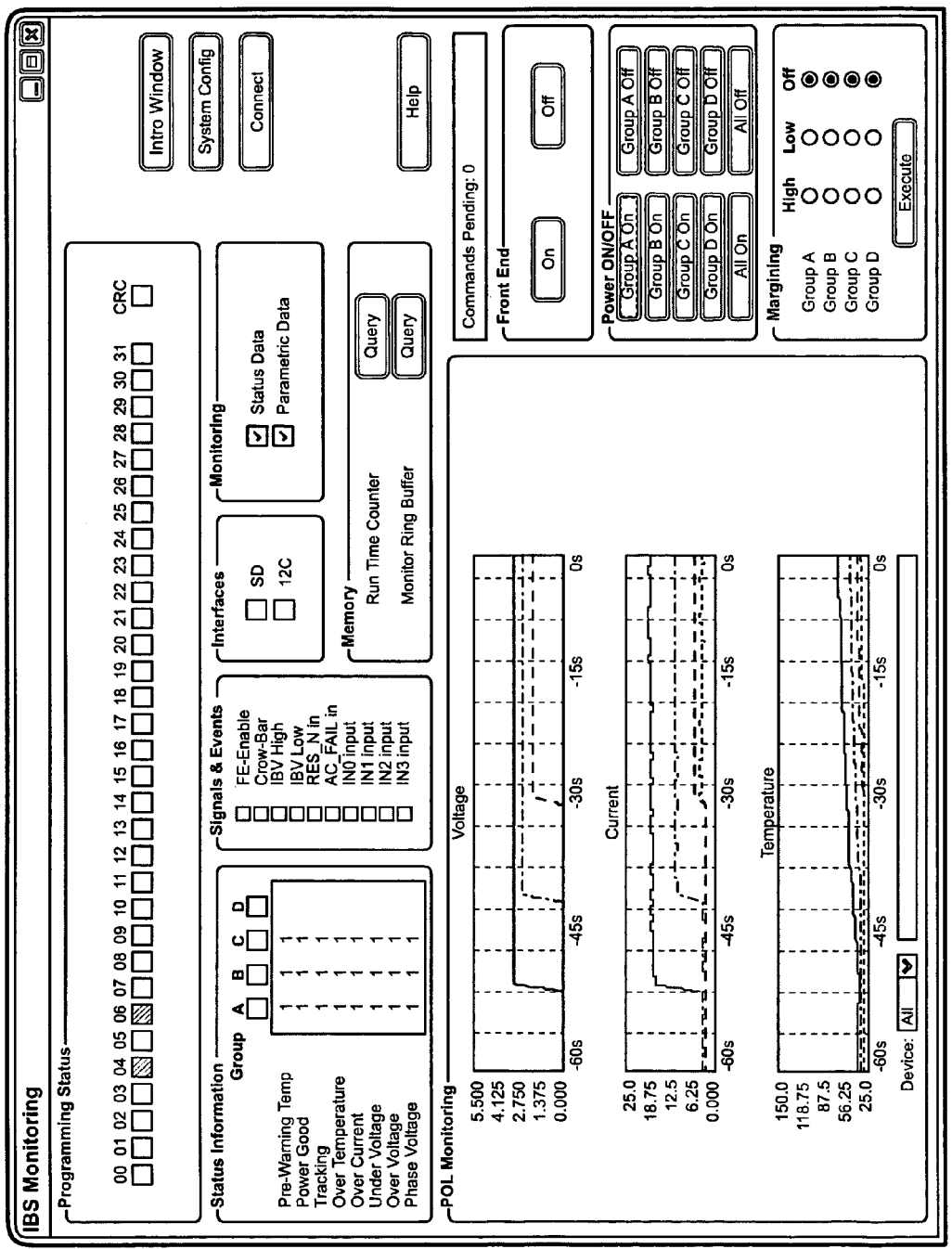
FIG. 7 is an exemplary screen shot depicting a graphical user interface (GUI) for monitoring POL regulators within a POL control system.

FIG. 7 illustrates a GUI that enables the user to monitor performance of the POL regulators. Using the GUI, the user can program the specific performance parameters of the POL regulators that are desired to be monitored, as well as the frequency of updating the monitoring data. Also, the performance monitoring programming can be different for each POL group. At the top of the screen, each POL regulator of the power control system is listed along with a status icon. The status icon may include a color reflect the operational status of the POL regulator. For example, if the status icon for a POL regulator is green, then the programming data was communicated successfully to the POL regulators. Conversely, if the status icon for a POL regulator is red, then the programming data was not communicated successfully to the POL regulator. The GUI also shows graphically the parameters of the ring buffer elapsed over time. The GUI further includes buttons that enable individual POL regulators or groups of POL regulators to be shut down. The digital power manager also monitors the duration of time that it has been in operation. The Run Time Counter is active whenever the digital power manager is powered up. New counter state is saved into non-volatile memory at least once per day of continuous operation. Contents of the counter can be examined in the GUI or directly via the I²C bus using high and low level commands.

Having thus described a preferred embodiment of a method and system to control and monitor an array of DC/DC power converters, it should be apparent to those skilled in the art that certain advantages of the system have been achieved. It should also be appreciated that various modifications, adaptations, and alternative embodiments thereof may be made within the scope and spirit of the present invention.

What is claimed is:

1. A power control system comprising:
   a plurality of point-of-load (POL) regulators each adapted to convey regulated power to a load;
   a serial data bus operatively connecting said plurality of POL regulators; and
   a digital power manager connected to said serial data bus, said digital power manager including a controller adapted to execute stored instructions to program operational parameters of said plurality of POL regulators via said serial data bus and receive monitoring data from said plurality of POL regulators via said serial data bus.

2. The power control system of claim 1, wherein said digital power manager further comprises a user interface adapted to receive programming data therefrom and send said monitoring data thereto.

3. The power control system of claim 2, wherein said user interface further comprises an I²C interface.

4. The power control system of claim 1, wherein said digital power manager comprises a non-volatile memory containing a plurality of registers.

5. The power control system of claim 4, wherein said plurality of registers includes a digital power manager configuration register containing data values defining a configuration of the power control system.

6. The power control system of claim 4, wherein said plurality of registers includes at least one POL set-up register containing data values reflecting programming state of one of said plurality of POL regulators.

7. The power control system of claim 4, wherein said plurality of registers includes at least one POL monitor register containing data values reflecting status of operating conditions within one of said plurality of POL regulators.

8. The power control system of claim 7, wherein said at least one POL monitor register further comprises a ring buffer.

9. The power control system of claim 4, wherein said plurality of registers includes a user-definable space.

10. The power control system of claim 1, wherein said digital power manager further comprises a power-on reset device adapted to delay initialization of the controller until input power has stabilized at an appropriate level.

11. The power control system of claim 1, wherein said digital power manager further comprises a monitoring device adapted to receive plural inputs reflecting system level conditions.

12. The power control system of claim 1, wherein said plurality of POL regulators further comprises plural groups of plural POL regulators.

13. The power control system of claim 12, further comprising a plurality of OK status lines coupled to respective ones of said plural groups of POL regulators.

14. The power control system of claim 1, wherein said digital power manager is adapted to program voltage margining of each of said plurality of POL regulators.

15. The power control system of claim 1, further comprising at least one host user system operatively coupled to said digital power manager, said at least one host user system further comprising a graphical user interface providing monitoring and programming of said power control system.

16. The power control system of claim 15, wherein said graphical user interface further provides an interface for programming voltage margining of each of said plurality of POL regulators.

17. The power control system of claim 15, wherein said graphical user interface further provides an interface for monitoring operating conditions of said plurality of POL regulators.

18. The power control system of claim 15, wherein said graphical user interface further provides an interface for programming said plurality of POL regulators.

19. The power control system of claim 1, wherein said plurality of POL regulators each further comprises respective voltage converters.

20. The power control system of claim 1, wherein said plurality of POL regulators each further comprises respective DC-DC converters.

21. The power control system of claim 1, wherein at least two of said plurality of POL regulators are grouped to provide current sharing.

22. The power control system of claim 1, wherein said digital power manager is adapted to receive fault detection information from said plurality of POL regulators via said serial data bus.

23. A power manager for use in a power control system comprising a plurality of point-of-load (POL) regulators each having a respective power conversion circuit adapted to convey power to a load, and a serial data bus operatively connecting said plurality of POL regulators, said power manager comprising a controller adapted to execute stored instructions to program operational parameters of said plurality of POL regulators via said serial data bus and receive monitoring data from said plurality of POL regulators via said serial data bus.

24. The power manager of claim 23, further comprising a user interface adapted to receive programming data therefrom and send said monitoring data thereto.

25. The power manager of claim 24, wherein said user interface further comprises an I$^2$C interface.

26. The power manager of claim 23, further comprising a non-volatile memory containing a plurality of registers.

27. The power manager of claim 26, wherein said plurality of registers includes a power manager configuration register containing data values defining a configuration of the power control system.

28. The power manager of claim 26, wherein said plurality of registers includes at least one POL set-up register containing data values reflecting programming state of one of said plurality of POL regulators.

29. The power manager of claim 26, wherein said plurality of registers includes at least one POL monitor register containing data values reflecting status of operating conditions within one of said plurality of POL regulators.

30. The power manager of claim 29, wherein said at least one POL monitor register further comprises a ring buffer.

31. The power manager of claim 26, wherein said plurality of registers includes a user-definable space.

32. The power manager of claim 23, further comprising a power-on reset device adapted to delay initialization of the controller until input power has stabilized at an appropriate level.

33. The power manager of claim 23, further comprising a monitoring device adapted to receive plural inputs reflecting system level conditions.

34. The power manager of claim 23, further comprising an interface operatively coupled to a plurality of OK status lines coupled to respective ones of said plurality of POL regulators.

35. The power manager of claim 23, wherein said controller is adapted to program voltage margining of each of said plurality of POL regulators.

36. The power manager of claim 23, wherein said controller is adapted to receive fault detection information from said plurality of POL regulators via said serial data bus.

37. The power manager of claim 23, further comprising an integrated circuit.

\* \* \* \* \*